(12) United States Patent
Kumar et al.

(10) Patent No.: US 12,143,283 B2
(45) Date of Patent: Nov. 12, 2024

(54) NETWORK MONITORING TOOL

(71) Applicant: T-Mobile Innovations LLC, Overland Park, KS (US)

(72) Inventors: Manoj Kumar, Overland Park, KS (US); Leyth Wehelie Adan, Seattle, WA (US); Christopher Michael O'Boyle, Lenexa, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 354 days.

(21) Appl. No.: 17/683,633

(22) Filed: Mar. 1, 2022

(65) Prior Publication Data

US 2023/0300042 A1 Sep. 21, 2023

(51) Int. Cl.
*H04L 43/045* (2022.01)
*H04L 41/22* (2022.01)
*H04L 43/12* (2022.01)
*H04W 24/06* (2009.01)

(52) U.S. Cl.
CPC ............ *H04L 43/045* (2013.01); *H04L 41/22* (2013.01); *H04L 43/12* (2013.01); *H04W 24/06* (2013.01)

(58) Field of Classification Search
CPC ....... H04L 43/045; H04L 43/12; H04L 43/50; H04L 41/22; H04L 41/5009; H04W 24/06
See application file for complete search history.

(56) References Cited

U.S. PATENT DOCUMENTS

| | | | | |
|---|---|---|---|---|
| 8,436,870 | B1* | 5/2013 | Aguaviva | G06T 15/005 |
| | | | | 345/506 |
| 9,210,056 | B1* | 12/2015 | Choudhary | H04L 69/329 |
| 10,708,122 | B1* | 7/2020 | Liu | H04W 8/30 |
| 2017/0052536 | A1* | 2/2017 | Warner | G06Q 10/06312 |
| 2017/0126521 | A1* | 5/2017 | Lala | H04W 4/021 |
| 2019/0199589 | A1* | 6/2019 | Le | G06N 20/00 |

\* cited by examiner

*Primary Examiner* — Siu M Lee
(74) *Attorney, Agent, or Firm* — Shook, Hardy & Bacon L.L.P.

(57) ABSTRACT

A method, apparatus, and system for network monitoring are provided. The method retrieves and processes performance data files from each technology type in the network. These performance data files are then loaded into a time series database. At least one key performance indicator is derived from the data. The performance data is organized by region and pool level and then displayed by region and pool level. The method provides configurable thresholds for key performance indicators and alerts users to those thresholds. The apparatus provides a display allowing both monitoring and test functions to be selected. The display is automatically updated based on a predetermined, selectable time interval.

20 Claims, 12 Drawing Sheets

| Location : SC1AMF01/W1/WSC/WsstSacramento,CA | | | | | | |
|---|---|---|---|---|---|---|
| KPI Interval : 18 Jan 2022 17:30:00 GMT | vAMF Statistics | | | RC | Nest Status | Software Version |
| | | | | 50 | InService | 21.5.0.5 |
| 15 Min KPI | SR% | Avg% | Attempts | Avg Att | 15 Min KCI | Current / Average |
| UE Registration | 96.19 | 96.15 | 59,268 | 40,925 | Registered UE (5G) | 30,938/28,377 |
| UE Init Registration | 97.33 | 96.97 | 4,001 | 2,727 | Regist. UE (5G/IMS) | 22,878/21,080 |
| AMF Registration | 100 | 100.0 | 44,665 | 30,226 | PDU Session | 46,876/42,802 |
| AMF Authentication | 99.98 | 99.95 | 46,331 | 31,367 | Conn. UEs (5G) | 9,288/7,925 |
| AMF Auth(5G AKA) | 99.99 | 100.0 | 46,005 | 31,146 | | |
| AMF Auth(SMC) | 99.67 | 99.69 | 91,104 | 61,651 | | |
| Create SM Context | 99.74 | 99.71 | 87,703 | 59,822 | | |
| Update SM Context | 99.45 | 99.51 | 821,800 | 598,496 | | |
| Retrieve SM Context | 99.95 | 99.92 | 79,503 | 54,115 | MPH Msgs/Sec | 8,829/6,287 |
| UE PDU Est Initial | 90.72 | 89.84 | 12,539 | 10,118 | 15 Min KEI | |
| UE PDU Est Initial IMS | 94.63 | 93.51 | 3,297 | 2,472 | CPPS/IPDS/NECC | Normal |
| UE PDU Est Existing | 0 | 5.13 | 0 | 0.48 | Per PLMN | Normal |
| UE Service Request MT | 99.64 | 99.68 | 41,935 | 30,273 | | |
| UE Service Request | 99.3 | 99.31 | 131,610 | 97,761 | Ng Setup Failure/Attempts | 20/25 |
| PDU Sess. Resource Setup | 101.92 | 101 | 31,540 | 22,052 | N2 Disabled/Enabled | 13/3,369 - 12/3,375 |
| PDU Sess. Resource Modify | 99.27 | 97.06 | 2,340 | 1,275 | UE Registration CC | Normal |
| NF Discovery (Total) | 1.08 | 4.64 | 836 | 620 | UE PDU Session CC | Normal |
| NF Discovery (SMF) | 1.11 | 2.7 | 812 | 586 | SM Context CC | Normal |
| Activate SMS (AMF<->SMSF) | 100 | 100.0 | 45,281 | 30,612 | AMF Auth CC | Normal |
| UE paging (5GS) | 95.37 | 96.26 | 48,406 | 34,999 | NF Discovery | Normal |
| Idle Mobility (5GS->EPS) | 98.52 | 98.44 | 40,470 | 27,708 | Throttled/Dropped | verify? |
| Idle Mobility (EPS->5G) | 90.7 | 91.04 | 44,072 | 29,834 | | |
| Probe Test Results → | Auth SR% | Reg SR% | PDU SR% | PDU Time | Auth/Reg Time | Pkts Lost \| POLQA |
| 5G Probe VoNR | null | null | 100 | 1064.19 ms | null | 0 / 4.57 |
| 5G Probe Data | null | null | 100 | 700.78 ms | null | null |

SPIRENT™ EZ ADHOC TEST (5G) → AMF → SC1AMF01

Test Parameters

SC1AMF01
- ● 5G Registration (            )
- ○ 5G Data (            )
- ○ 5G Voice/VoNR (            )

☐ TAC
Select TAC from the Dropdown List or input TAC manually

[type to search...]     [Submit]

STATUS: COMPLETED

PASSED
createTime: 2022-01-18T17:20:09.717Z
Download PCAP FILE
[Show Results]

SPIRENT™ EZ ADHOC TEST (5G) → AMF → SC1AMF01

Test Parameters

SC1AMF01
● 5G Registration
○ 5G Data
○ 5G Voice/VoNR

☐ TAC
Select TAC from the Dropdown List or input TAC manually type to search...

ALBUQUERQUE - 3014912 - HB'2E'
MONTANA - 4454400 - HB'43'
PORTLAND - 3533568 - HB'35'
SALTLAKECITY - 2816000 - HB'2A'
SALTLAKECITY - 2882560 - HB'2B'
SALTLAKECITY - 2974720 - HB'2D'
SEATTLE - 2944000 - HB'2C'
SPOKANE - 4019712 - HB'3D'

Submit

STATU
PASS
create
Download
Show R

NETWORK MONITORING TOOL

BACKGROUND

Currently, network monitoring tools used by mobile communications companies are dispersed across multiple systems, resulting in a complex and time-consuming series of steps to troubleshoot and identify problems across the network. Often, engineers must check and review multiple tools with varying outputs. Each tool may have different data collection intervals and limited scope. Current monitoring tools may not adequately detect network issues occurring across technology types, such as mobility management entity (MME), access and mobility management functions (AMF), network function repository function (NRF), and short message service function (SMSF), to name just a few. Multiple tools may be needed to detect problems across technologies and with each tool presenting a different display, it can be difficult to correlate issues and resolve problems rapidly.

Multiple metrics are tracked by network operators and each metric may be presented differently on a display. Because of the multitude of steps and tools, there is no unified display for all network nodes related to key performance indicators (KPI), key error indicators (KET), key capacity indicators (KCI), and key quality indicator (KQI). There is a need in the art for an aggregated data and display tool for real-time network monitoring and troubleshooting.

SUMMARY

A high-level overview of various aspects of the present technology is provided in this section to introduce a selection of concepts that are further described below in the detailed description section of this disclosure. This summary is not intended to identify key or essential features of the claimed subject matter, nor is it intended to be used as an aid in isolation to determine the scope of the claimed subject matter.

According to aspects herein, methods and systems for implementing a network monitoring tools are provided. The method of network monitoring comprises retrieving and processing performance data files from each technology type. The performance data files are then loaded into a time series database. The method continues with deriving at least one average for at least one key performance indicator (KPI). The performance data is then organized by region and pool level. After organizing the performance data is displayed by region and pool level. The method continues with configuring a threshold for the at least one KPI. A user may then be alerted to a threshold for the at least one KPI, and a display is automatically updated based on a predetermined time interval.

Aspects herein provide a device for network monitoring. The device includes a display, a processor, and a memory. The memory stores executable instructions that, when executed by the processor perform operations comprising: retrieving and processing performance data files from each technology type; loading the performance data files into a time series database; deriving at least one average for at last one key performance indicator (KPI); organizing the performance data by region and pool level; displaying the performance data by region and pool level; configures a threshold for the at least one KPI; and updating automatically a display based on a predetermined time interval.

A system for performance monitoring is also provided by aspects of the present disclosure. The system comprises a memory storing computer-executable instructions; and a processor configured to access the memory and to execute the computer-executable instructions. The computer-executable instructions: retrieve and process performance data files from each technology type; load the performance data files into a time series database; derive at least one average for at least one key performance indicator (KPI); organize the performance data by region and pool level; display the performance by region and pool level; configure a threshold for the at least one KPI; alert a user to the threshold for the at least one KPI; and update automatically a display based on a predetermined time interval.

The present systems and methods address the shortcomings of current network monitoring systems. The display utilizes performance data that is collected, processed, and presented in near real-time. The network monitoring tool assists with network troubleshooting and real-time detection and monitoring.

BRIEF DESCRIPTION OF THE SEVERAL VIEWS OF THE DRAWINGS

Implementations of the present disclosure are described in detail below with reference to the attached drawing figures, wherein:

FIG. 8 depicts a heat map key performance indicate (KPI) and probe test results screen, in accordance with aspects herein.

FIG. 10 depicts a 5G test parameters screen, in accordance with aspects herein:

FIG. 11 depicts a drop down menu for selecting cities to test using 5G test probes, in accordance with aspects herein.

DETAILED DESCRIPTION

Figure 1:
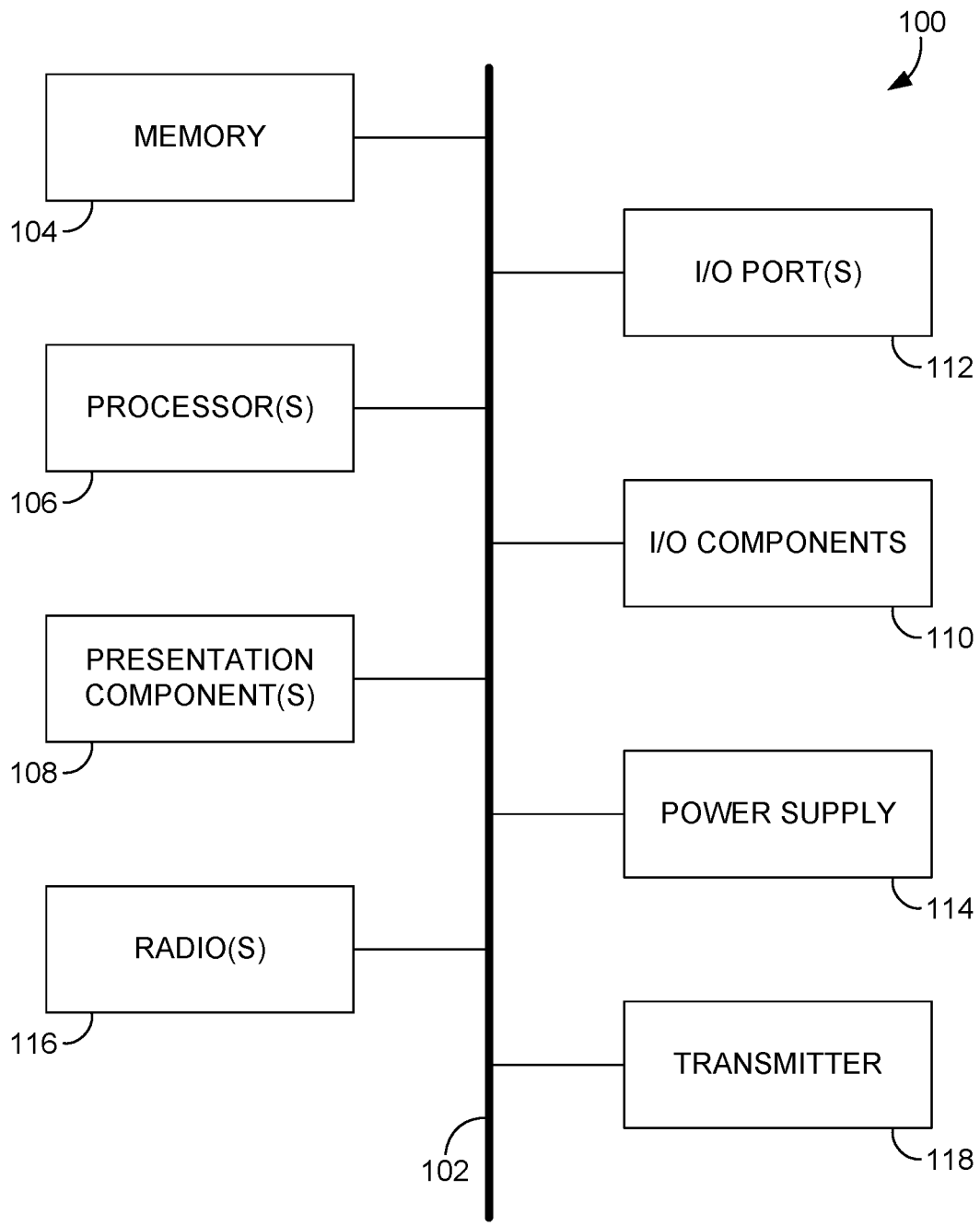
FIG. 1 depicts a diagram of an exemplary network environment in which implementations of the present disclosure may be employed, in accordance with aspects herein.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. Various technical terms are used throughout this description. An illustrative resource that fleshes out various aspects of these terms can be found in Newton's Telecom Dictionary, 25th Edition (2009).

Embodiments of the present technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, a traditional telecommunications network employs a plurality of base stations (i.e., access point, node, cell sites, cell towers) to provide network coverage. The base stations are employed to broadcast and transmit transmissions to user devices of the telecommunications network. An access point may be considered to be a portion of a base station that may comprise an antenna, a radio, and/or a controller. In aspects, an access point is defined by its ability to communicate with a user equipment (UE), such as a wireless communication device (WCD), according to a single protocol (e.g., 3G, 4G, LTE, 5G, and the like); however, in other aspects, a single access point may communicate with a UE according to multiple protocols. As used herein, a base station may comprise one access point or more than one access point. Factors that can affect the telecommunications transmission include, e.g., location and size of the base stations, and frequency of the transmission, among other factors. The base stations are employed to broadcast and transmit transmissions to user devices of the telecommunications network. Traditionally, the base station establishes uplink (or downlink) transmission with a mobile handset over a single frequency that is exclusive to that particular uplink connection (e.g., an LTE connection with an EnodeB). In this regard, typically only one active uplink connection can occur per frequency. The base station may include one or more sectors served by individual transmitting/receiving components associated with the base station (e.g., antenna arrays controlled by an EnodeB). These transmitting/receiving components together form a multi-sector broadcast arc for communication with mobile handsets linked to the base station.

As used herein, UE (also referenced herein as a user device or a wireless communication device) can include any device employed by an end-user to communicate with a wireless telecommunications network. A UE can include a mobile device, a mobile broadband adapter, a fixed location or temporarily fixed location device, or any other communications device employed to communicate with the wireless telecommunications network. For an illustrative example, a UE can include cell phones, smartphones, tablets, laptops, small cell network devices (such as micro cell, pico cell, femto cell, or similar devices), and so forth. Further, a UE can include a sensor or set of sensors coupled with any other communications device employed to communicate with the wireless telecommunications network, such as, but not limited to, a camera, a weather sensor (such as a rain gage, pressure sensor, thermometer, hygrometer, and so on), a motion detector, or any other sensor or combination of sensors. A UE, as one of ordinary skill in the art may appreciate, generally includes one or more antennas coupled to a radio for exchanging (e.g., transmitting and receiving) transmissions with a nearby base station or access point.

In aspects, a UE provides UE data including location and channel quality information to the wireless communication network via the access point. Location information may be based on a current or last known position utilizing GPS or other satellite location services, terrestrial triangulation, an access point's physical location, or any other means of obtaining coarse or fine location information. Channel quality information may indicate a realized uplink and/or downlink transmission data rate, observed signal-to-interference-plus-noise ratio (SINR) and/or signal strength at the user device, or throughput of the connection. Channel quality information may be provided via, for example, an uplink pilot time slot, downlink pilot time slot, sounding reference signal, channel quality indicator (CQI), rank indicator, precoding matrix indicator, or some combination thereof. Channel quality information may be determined to be satisfactory or unsatisfactory, for example, based on exceeding or being less than a threshold. Location and channel quality information may take into account the user device capability, such as the number of antennas and the type of receiver used for detection. Processing of location and channel quality information may be done locally, at the access point or at the individual antenna array of the access point. In other aspects, the processing of said information may be done remotely.

A service state of the UEs may include, for example, an in-service state when a UE is in-network (i.e., using services of a primary provider to which the UE is subscribed to, otherwise referred to as a home network carrier), or when the UE is roaming (i.e., using services of a secondary provider providing coverage to the particular geographic location of the UE that has agreements in place with the primary provider of the UE). The service state of the UE may also include, for example, an emergency only state when the UE is out-of-network and there are no agreements in place between the primary provider of the UE and the secondary provider providing coverage to the current geographic location of the UE. Finally, the service state of the UE may also include, for example, an out of service state when there are no service providers at the particular geographic location of the UE.

In accordance with aspects herein, the UE data may be collected at predetermined time intervals measured in milliseconds, seconds, minutes, hours, or days. Alternatively, the UE data may be collected continuously. The UE data may be stored at a storage device of the UE, and may be retrievable by the UE's primary provider as needed and/or the UE data may be stored in a cloud based storage database and may be retrievable by the UE's primary provider as needed. When the UE data is stored in the cloud based storage database, the data may be stored in association with a data identifier mapping the UE data back to the UE, or alternatively, the UE data may be collected without an identifier for anonymity.

Based on the UE data, aspects herein include systems, methods, and computer readable media for a network monitoring tool. Current monitoring tools are dispersed across multiple systems, forcing users to take inefficient and time-consuming steps to monitor, troubleshoot, and identify issues across a network. Engineers need to check and view a series of dashboards one at a time for each node or key performance indicator (KPI). In some situations, the dashboard data may not be sufficiently current to accurately diagnose a network issue, due to delays in data collection. In addition, the current monitoring tools provide only a limited scope for detecting network issues across technology types such as: mobility management entities (MME), access and mobility management function (AMF), and network repository function (NRF), mobility management for internet-of-things (MME IOT), among others.

While the different technology types are different all have common functionalities that may be integrated into a single view. The network monitoring tool described herein provides a unified display for all network nodes related to: KPI, key error indicators (KEI), key capacity indicators (KCI), and key quality indicators (KQI). The network monitoring tool described herein is also integrated with performance monitoring tools for real-time on-demand or ad hoc tests to check the customer experience.

In accordance with a first aspect of the present disclosure, a method of network monitoring is provided. The method comprises retrieving and processing performance data files from each technology type. The performance data files are then loaded into a time series database. The method continues with deriving at least one average for at least one key performance indicator (KPI). The performance data is then organized by region and pool level. After organizing the performance data is displayed by region and pool level. The method continues with configuring a threshold for the at least one KPI. A user may then be alerted to a threshold for the at least one KPI, and a display is automatically updated based on a predetermined time interval.

Aspects herein provide a device for network monitoring. The device includes a display, a processor, and a memory. The memory stores executable instructions that, when executed by the processor perform operations comprising: retrieving and processing performance data files from each technology type; loading the performance data files into a time series database; deriving at least one average for at last one key performance indicator (KPI); organizing the performance data by region and pool level; displaying the performance data by region and pool level; configures a threshold for the at least one KPI; and updating automatically a display based on a predetermined time interval.

A system for performance monitoring is also provided by aspects of the present disclosure. The system comprises a memory storing computer-executable instructions; and a processor configured to access the memory and to execute the computer-executable instructions. The computer-executable instructions: retrieve and process performance data files from each technology type; load the performance data files into a time series database; derive at least one average for at least one key performance indicator (KPI); organize the performance data by region and pool level; display the performance by region and pool level; configure a threshold for the at least one KPI; alert a user to the threshold for the at least one KPI; and update automatically a display based on a predetermined time interval.

Turning to FIG. 1, a diagram is depicted of an exemplary computing environment suitable for use in implementations of the present disclosure. In particular, the exemplary computer environment is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In aspects, the computing device 100 may be a UE, or other user device, capable of two-way wireless communications with an access point. Some non-limiting examples of the computing device 100 include a cell phone, tablet, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, computing device 100 includes bus 102 that directly or indirectly couples the following devices: memory 104, one or more processors 106, one or more presentation components 108, input/output (I/O) ports 112, I/O components 110, radio 116, transmitter 118, and power supply 114. Bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O components 110. Also, processors, such as one or more processors 106, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as "workstation," "server," "laptop," "handheld device," etc., as all am contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 104 includes computer-storage media in the form of volatile and/or nonvolatile memory. Memory 104 may be removable, nonremovable, or a combination thereof. Exemplary memory includes solid-state memory, hard drives, optical-disc drives, etc. Computing device 100 includes one or more processors 106 that read data from various entities such as bus 102, memory 104 or I/O components 110. One or more presentation components 108 present data indications to a person or other device. Exemplary one or more presentation components 108 include a display device, speaker, printing component, vibrating component, etc. I/O ports 112 allow computing device 100 to be logically coupled to other devices including I/O components 110, some of which may be built into computing device 100. Illustrative I/O components 110 include a microphone, joystick, game pad, satellite dish, scanner, printer, wireless device, etc.

The radio 116 represents one or more radios that facilitate communication with a wireless telecommunications network. While a single radio 116 is shown in FIG. 1, it is contemplated that there may be more than one radio 116 coupled to the bus 102. In aspects, the radio 116 utilizes a transmitter 118 to communicate with the wireless telecommunications network. It is expressly conceived that a computing device with more than one radio 116 could facilitate communication with the wireless telecommunications network via both the first transmitter 118 and an additional transmitters (e.g. a second transmitter). Illustrative wireless telecommunications technologies include CDMA, GPRS, TDMA, GSM, and the like. The radio 116 may additionally or alternatively facilitate other types of wireless communications including Wi-Fi, WiMAX, LTE, 3G, 4G, LTE, 5G, NR, VoLTE, or other VoIP communications. As can be appreciated, in various embodiments, radio 116 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Figure 2:
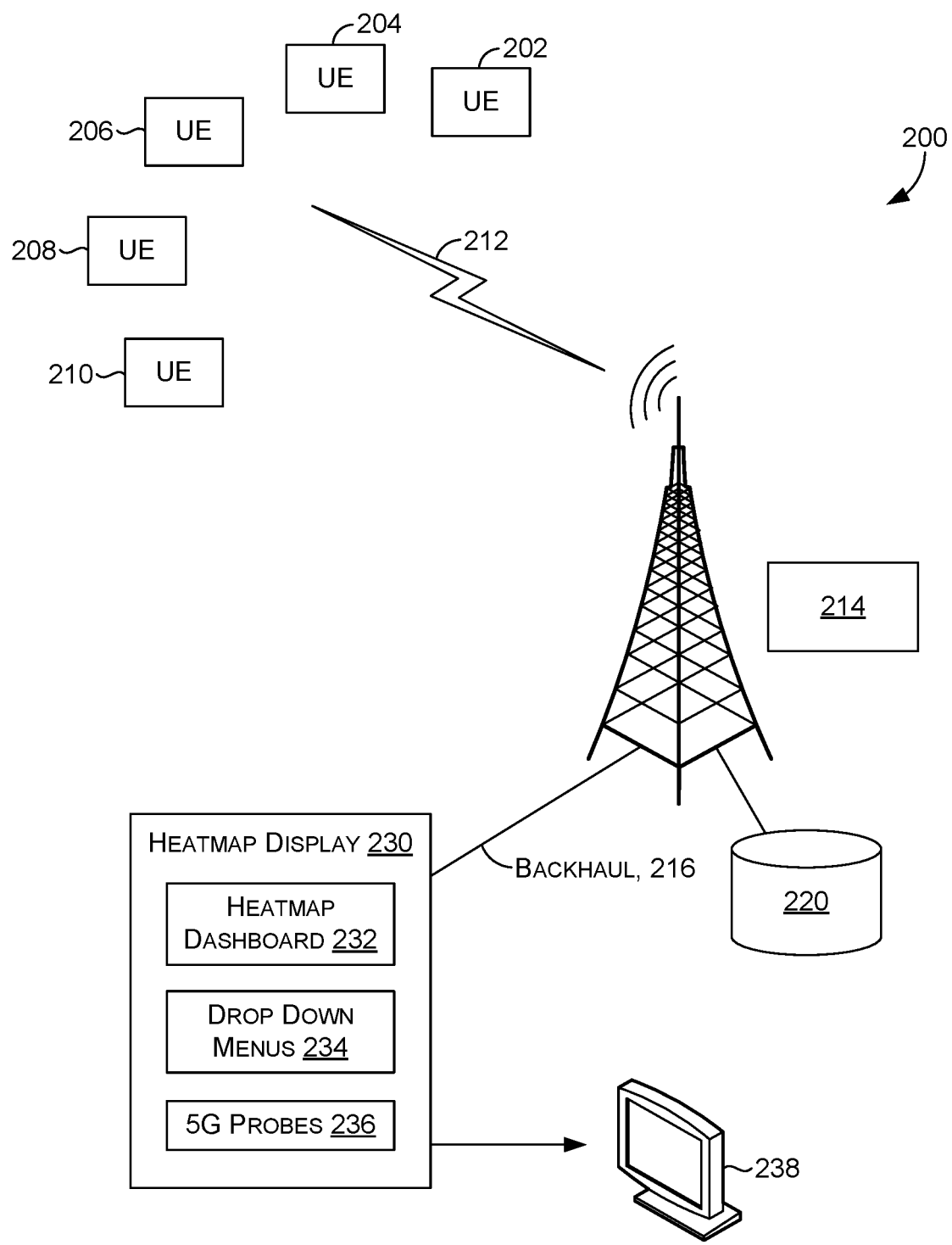
FIG. 2 depicts a computing environment suitable for use in implementations of the present disclosure, in accordance with aspects herein.

FIG. 2 provides an exemplary network environment in which implementations of the present disclosure may be employed. Such a network environment is illustrated and designated generally as network environment 200. Network environment 200 is not to be interpreted as having any dependency or requirement relating to any one or combination of components illustrated.

Network environment 200 includes user devices (UE) 202, 204, 206, 208, and 210, access point 214 (which may be a cell site, base station, or the like), and one or more communication channels 212. In network environment 200, user devices may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these delineated devices, or any other device (such as the computing device 100) that communicates via wireless communications with the access point 214 in order to interact with a public or private network.

In some aspects, each of the UEs 202, 204, 206, 208, and 210 may correspond to computing device 100 in FIG. 1. Thus, a UE can include, for example, a display(s), a power source(s) (e.g., a battery), a data store(s), a speaker(s), memory, a buffer(s), a radio(s) and the like. In some implementations, for example, a UEs 202, 204, 206, 208, and 210 comprise a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G, LTE, CDMA, or any other type of network.

In some cases, UEs 202, 204, 206, 208, and 210 in network environment 200 can optionally utilize one or more communication channels 212 to communicate with other computing devices (e.g., a mobile device(s), a server(s), a personal computer(s), etc.) through access point 214. The network environment 200 may be comprised of a telecommunications network(s), or a portion thereof. A telecommunications network might include an array of devices or components (e.g., one or more base stations), some of which are not shown. Those devices or components may form network environments similar to what is shown in FIG. 2, and may also perform methods in accordance with the present disclosure. Components such as terminals, links, and nodes (as well as other components) can provide connectivity in various implementations. Network environment 200 can include multiple networks, as well as being a network of networks, but is shown in more simple form so as to not obscure other aspects of the present disclosure.

The one or more communication channels 212 can be part of a telecommunication network that connects subscribers to their immediate telecommunications service provider (i.e., home network carrier). In some instances, the one or more communication channels 212 can be associated with a telecommunications provider that provides services (e.g., 3G network, 4G network, LTE network, 5G network, and the like) to user devices, such as UEs 202, 204, 206, 208, and 210. For example, the one or more communication channels may provide voice, SMS, and/or data services to UEs 202, 204, 206, 208, and 210, or corresponding users that are registered or subscribed to utilize the services provided by the telecommunications service provider. The one or more communication channels 212 can comprise, for example, a 1× circuit voice, a 3G network (e.g., CDMA, CDMA2000, WCDMA, GSM, UMTS), a 4G network (WiMAX, LTE, HSDPA), or a 5G network.

In some implementations, access point 214 is configured to communicate with a UE, such as UEs 202, 204, 206, 208, and 210, that are located within the geographic area, or cell, covered by radio antennas of access point 214. Access point 214 may include one or more base stations, base transmitter stations, radios, antennas, antenna arrays, power amplifiers, transmitters/receivers, digital signal processors, control electronics, GPS equipment, and the like. In particular, access point 214 may selectively communicate with the user devices using dynamic beamforming.

As shown, access point 214 is in communication with a network database 220 and a heat map display 230 via a backhaul channel 216. As the UEs 202, 204, 206, 208, and 210 collect individual status data, the status data can be automatically communicated by each of the UEs 202, 204, 206, 208, and 210 to the access point 214. Access point 214 may store the data communicated by the UEs 202, 204, 206, 208, and 210 at a network database 220. Alternatively, the access point 214 may automatically retrieve the status data from the UEs 202, 204, 206, 208, and 210, and similarly store the data in the network database 220. The data may be communicated or retrieved and stored periodically within a predetermined time interval which may be in seconds, minutes, hours, days, months, years, and the like. With the incoming of new data, the network database 220 and heat map display 230 may be refreshed with the new data every time, or within a predetermined time threshold so as to keep the status data stored in the network database 220 current and the data status data displayed on the heat map display 230 current. For example, the data may be received at or retrieved by the access point 214 every 10 minutes and the data stored at the network database 220 may be kept current for 30 days, which means that status data that is older than 30 days would be replaced by newer status data at 10 minute intervals. As described above, the status data collected by the UEs 202, 204, 206, 208, and 210 can include, for example, service state status, the respective UE's current geographic location, a current time, a strength of the wireless signal, available networks, and the like.

The heat map display 230 comprises a heat map dashboard 232 incorporating drop down menus 234 and 5G probes 236. The heat map display 230 may also include further test and data collection options. The heat map display 230 includes a heat map dashboard 232 that may provide an overview of an entire cellular network. Additional data may be accessed using heat map dashboard 232 and selectable drop down menus 234 to drill down to specific service regions and pools, depending on the structure of the network environment 200. The heat map dashboard 232 may also include 5G probes 236 to test specific nodes and performance metrics. Other test tools may also be provided, similarly to the 5G probes 236, and these may also be provided using drop down menus 234 or other selection mechanisms. The heat map display 230 integrates both testing tools and performance monitoring tools in a single heat map dashboard 232.

The heat map display 230 is configured to retrieve the status data from the network database 220 and calculate various values that are useable for displaying on the heat map dashboard 232. The heat map dashboard 232 displays a service state (i.e., out of service, out of reporting, emergency only service, or in service) of each access point 214 associated with a chosen geographic location (e.g., state, city, county, town, neighborhood, landmark, region, pool, and the like) and a particular period or range of time of interest, and the heat map display 230 and the heat map dashboard 232 are configured to generate mapping data and display data to display a dynamic display of current network environment 200 performance and also test data on heat map dashboard 232 on a network display device 238. The network display device 238 may be any suitable device for presenting the heat map display 300, shown in FIG. 3.

The network display device 238 may be comprised of any suitable display device for presenting the heat map 300 and other data to a user. For example, a suitable display device may include a computer monitor, a laptop display, a tablet display, a mobile device display, and the like. The display device 238 may include computer readable instructions for displaying the data, test, and performance options discussed further in FIG. 3. The features and menus may be displayed with multiple visual characteristics such as color and fill. The different visual characteristic may include using, for example, different hatching (as shown), stippling, shading, coloring, and the like, to fill in the separate regions of the display.

Figure 3:
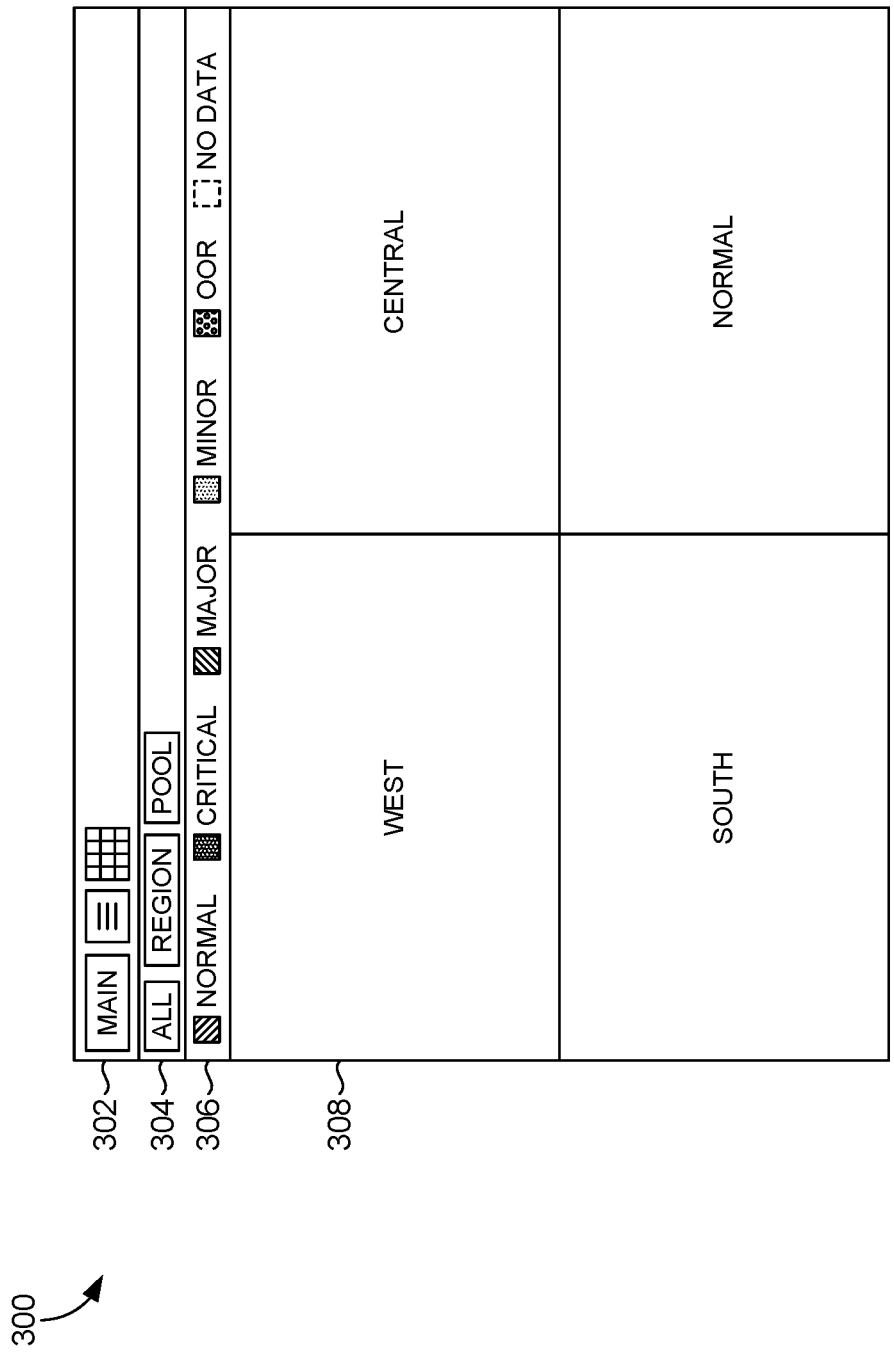
FIG. 3 illustrates a heat map display suitable for use in implementations of the present disclosure, in accordance with aspects herein.

FIG. 3 illustrates a heat map display screen 300. The heat map display screen 300 provides an overview of the performance and test data for the network environment 200. The heat map display screen includes functions and display settings 302, which may include selection buttons such as a main network view, showing all regions. The display settings 302 may also include buttons allowing a user to switch between a list display of all access points 214 and a grid display. Additional selection functions 304 may include buttons to select which access points 214 to view, including ALL for all access points 214, or nodes, or to select to view a region, such as a particular geographic region. A further selection function 304 may provide the ability to select a particular pool of nodes.

The heat map display screen 300 may be provided in color, with nodes or access points colored according to performance data or test results. The color keys 306 may provide an easy way to quickly determine which nodes performance and to indicate grades of performance. For example, a well-functioning node may be shown with a green background color, while a red background color indicates a node with critical performance issues. A node with a major performance issue may appear as orange, while an out of rotation (OOR) node may have a blue background. A node with no data may appear gray.

Figure 4:
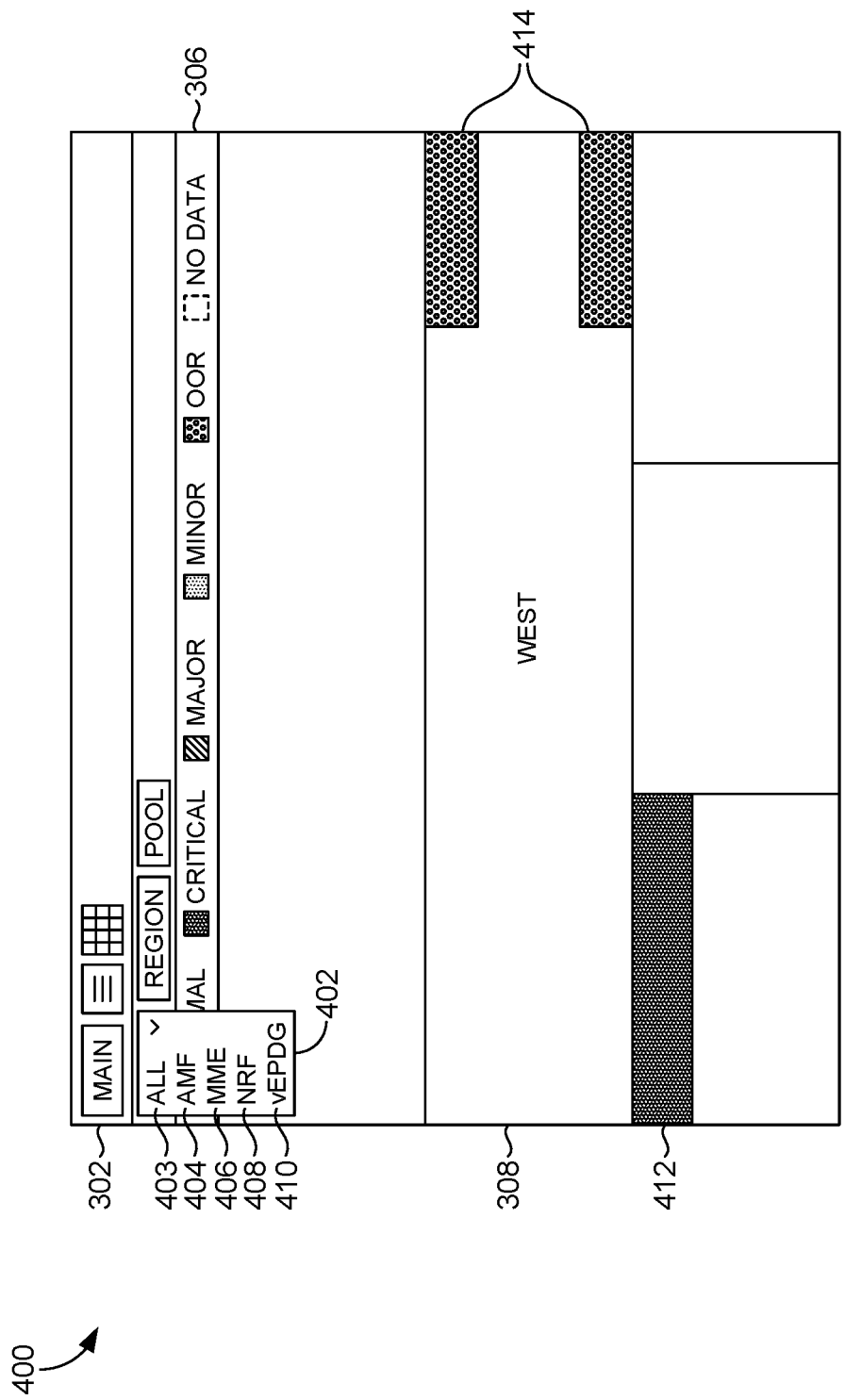
FIG. 4 illustrates a heat map technology selection screen, in accordance with aspects herein.

FIG. 4 illustrates a heat map technology menu selection screen 400 incorporating drop-down menus. The heat map technology selection drop down menu 402 may be accessed by clicking on selection functions 304. Technology selection drop down menu 402 is shown selected in FIG. 4. The technology selection drop down menu 402 provides the ability to select from the following technologies: all technologies (ALL) 403, access and mobility management function (AMF) 404, network repository function (NRF) 408, and virtualized evolved packet data gateway (VEPDG) 410. The heat map technology menu selection screen 400 of FIG. 4 also illustrates a network region 308, with the WEST region selected. In addition, ALL technology 403 is shown checked in the heat map technology selection drop down menu 402. Also shown is a west region node in critical condition 412, which has a solid red background. FIG. 4 also shows OOR nodes 414, which appear with a blue background color, shown as small circles in FIG. 4. The color keys 306 may also be selected by clicking, providing a readily available perspective on how nodes in the network are performing at the moment.

Figure 5:
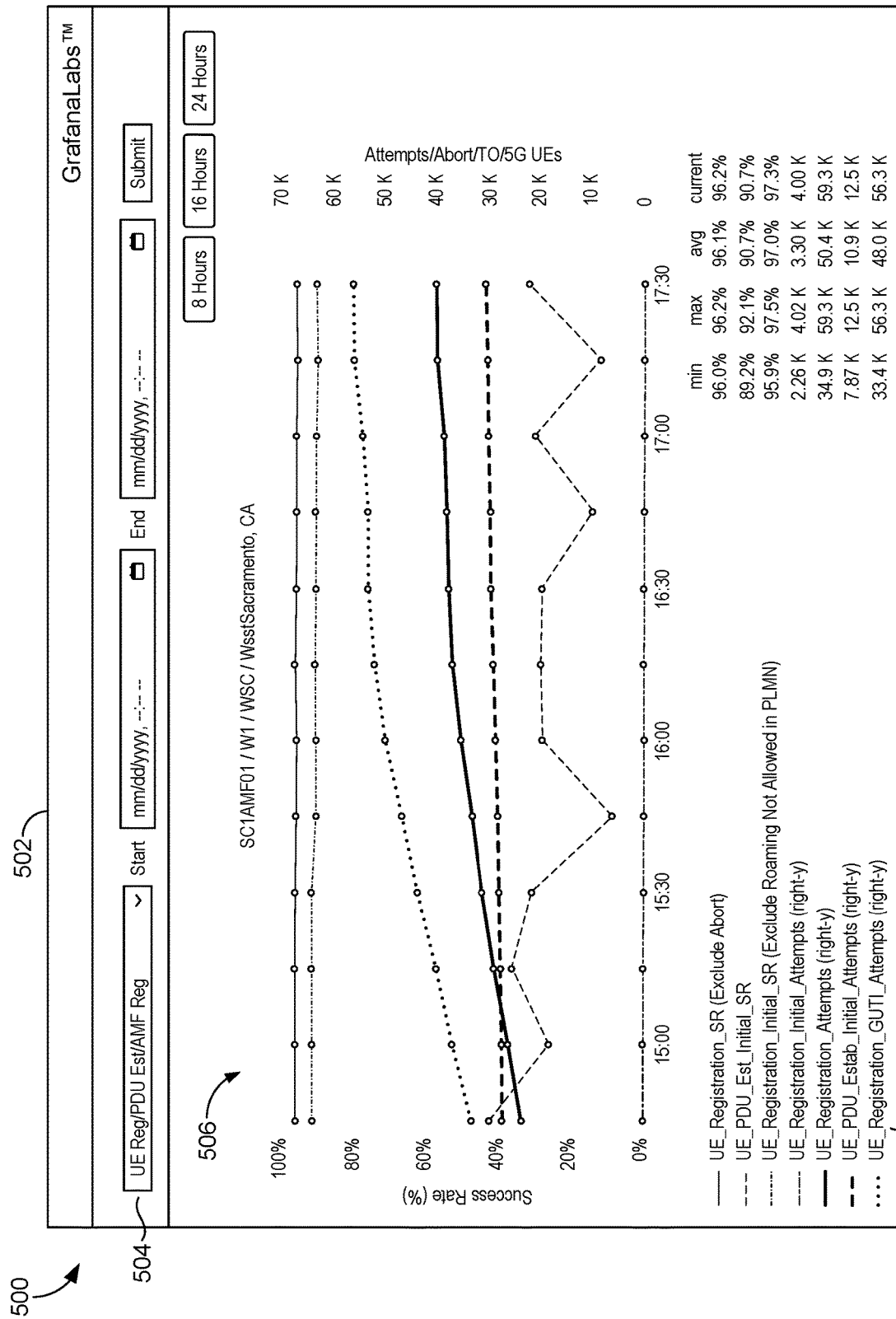
FIG. 5 illustrates a pop-out window in a heat map display screen, in which implementations of the present disclosure may be employed, in accordance with aspects herein.

FIG. 5 illustrates a pop-out window 500, which forms a part of the heat map display. The pop-out window 500 for a selected node appears when a particular access point 214 is selected for further performance and testing using the heat map system. The heat map display may use GrafanaLabs$^{TM}$ for the dashboard as illustrated in FIG. 5 as an example. However, any suitable software or hardware implementation may be used. Node selection may be made by clicking on the selected node in a portion of the heat map technology menu selection screen 400. The node selected may be a node having critical performance issues, shown by a solid red background, such as west region node in critical condition 412, in FIG. 4. Once the selection is made, the pop-out window 500 appears on top of the heat map technology menu selection screen 400.

The pop-out window 500 for a selected node includes a node identification bar 502. The node identification bar may provide an alphanumeric node identification code, time zone information, and retention policy for the data to be displayed in the pop-out window for the selected node. A node performance data bar 504 provides additional selections using drop-down menus. The drop down menus in node performance data bar 504 allow a variety of key performance indicators (KPIs) to be monitored and tested. These KPIs may include UE registrations, both total attempts and initial attempts, and number of protocol data unit (PDU) establishment attempts, to name a few. Once at least one KPI has been selected from the drop-down menu, start and stop dates may be selected, as shown in the node performance data bar 504.

Once the KPIs of interest have been selected and the time frame selected, the heat map display responds with a node performance metrics display 506 and a node performance metrics table 508. The node performance metrics display 506 provides a graphical view of the success rate plotted against the attempts made. The graphical view may be implemented using GrafanaLabs$^{TM}$ performance metrics may produce different graphical displays, depending on the performance metrics selected. The node performance metrics table provides minimum, maximum, average, and current values for the selected performance metrics. As an example, the node performance metrics table 508 considers UE registrations, UE PDU estimates, initial UE registrations, etc.

Figure 6:
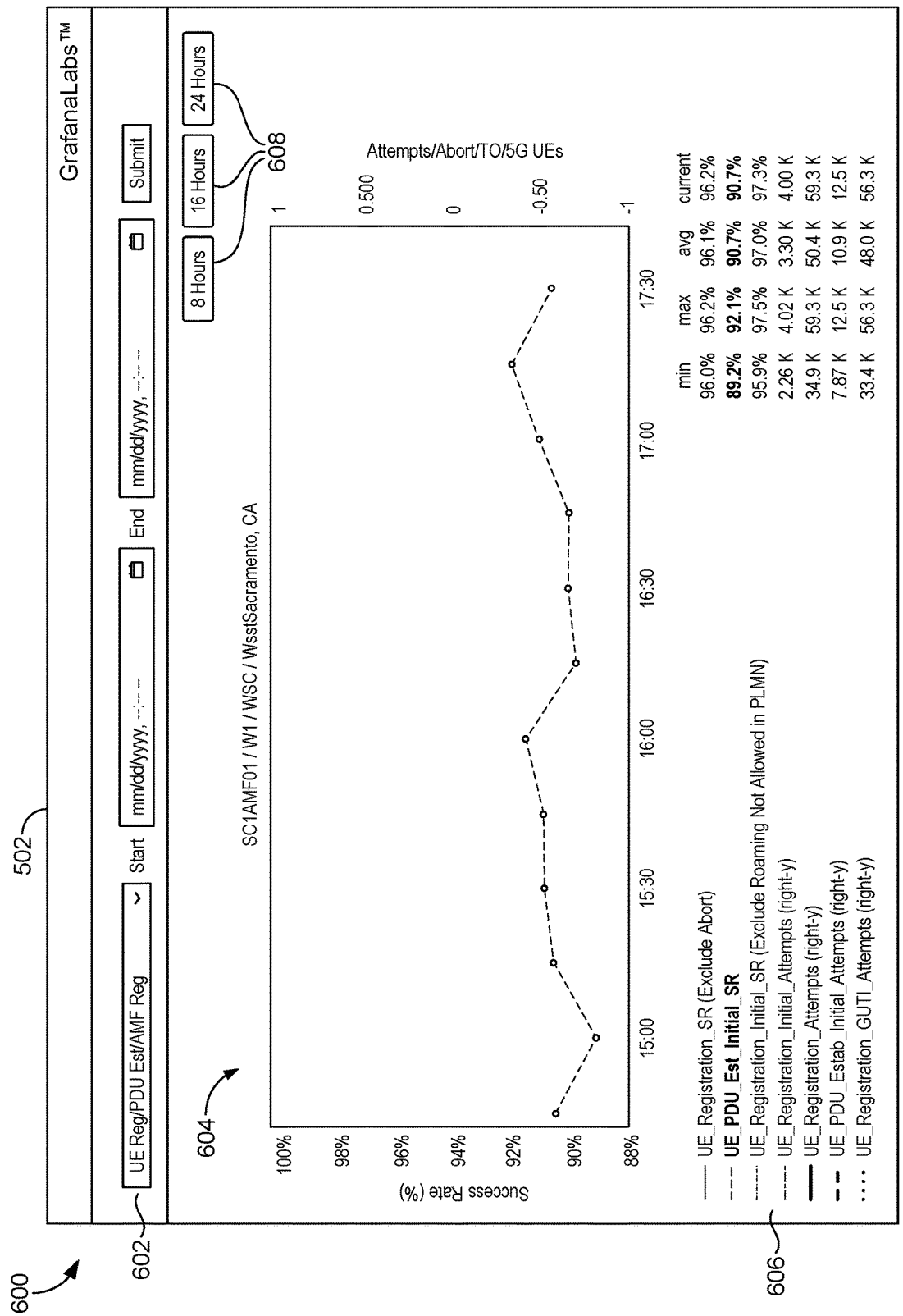
FIG. 6 depicts selecting performance data to display for a selected node, in accordance with aspects herein.

FIG. 6 illustrates selecting performance data to display for a selected node, in accordance with aspects of the present disclosure. The node identification bar 502 appears at the top of the performance data selection screen 600. The performance data selection screen 600 is shown with a performance metric drop down screen 602. From the performance metric drop down menu box 602 a user selects, such as by clicking, a performance metric, which is then displayed in the performance metric drop down menu box 602. The selected performance metric graph 604 is then computed and presented. The graph may be generated using GrafanaLabs$^{TM}$ application software, however, any suitable application or software may be used. In addition, the selected performance metric data may be presented in the selected performance metric table 606, to allow users to examine data in the aggregate. The performance data selection screen 600 further provides time frame selection buttons 608. The time frame selection buttons 608 allow user to examine data over a time period of interest, such as eight hours, sixteen hours, or twenty four hours. Using the time frame selection buttons 608 provides users with the ability to view trends in node and network performance.

Figure 7:
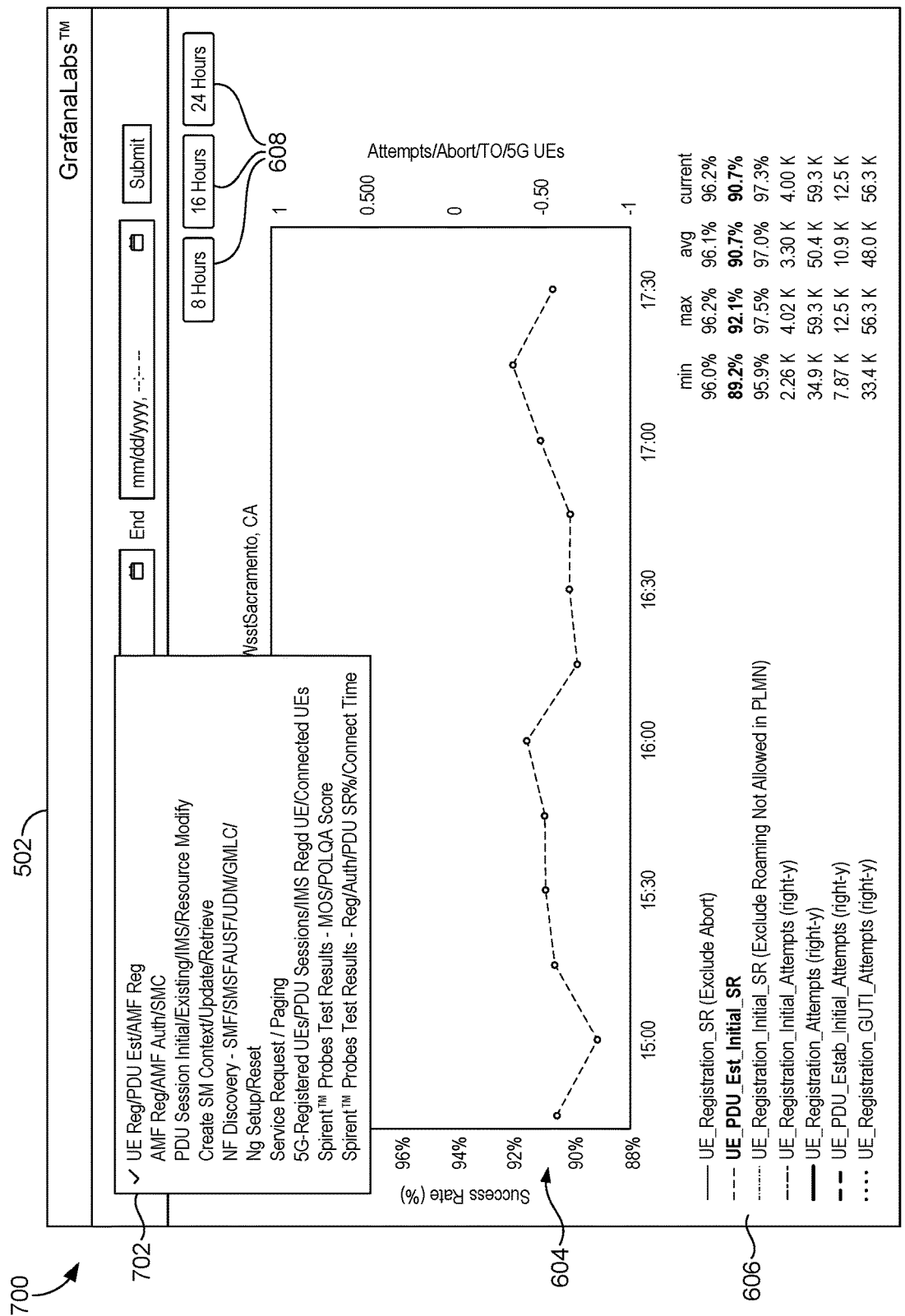
FIG. 7 illustrates performance data display with drop down menu for a selected metric, in accordance with aspects herein.

FIG. 7 depicts the selection of a performance metric in a heat map performance data display 700. The heat map performance data display 700 includes node identification bar 502. Also shown is the performance metric drop down menu 702, showing a selection checked for display, UE registration/PDU estimate. Once the selection is made, the checked performance metric graph 604 appears and the selected performance metric table 606 appears below. The heat map performance data display 700 may also use GrafanaLabs$^{TM}$ software to generate the display. GrafanaLabs$^{TM}$ is used as an example and the concepts discussed herein are not limited to any particular application or software.

FIG. 8 depicts a heat map key performance indicator (KPI) and probe test results screen, 800. The KPI and probe test results screen includes KPI and key capacity indicator (KCI) bar 802 which provides heading for the measured categories. Below the KPI and KCI bar 802 the metrics result chart 804 during the testing are presented in tabular form. The metrics result chart also includes probe test results 806. A variety of probes may be used to provide test results, including custom and proprietary 5G test probes and virtual test probes. Spirent$^{TM}$ test probes are shown in FIGS. 7 and 10 as examples only. Any suitable test probes may be used.

Figure 9:
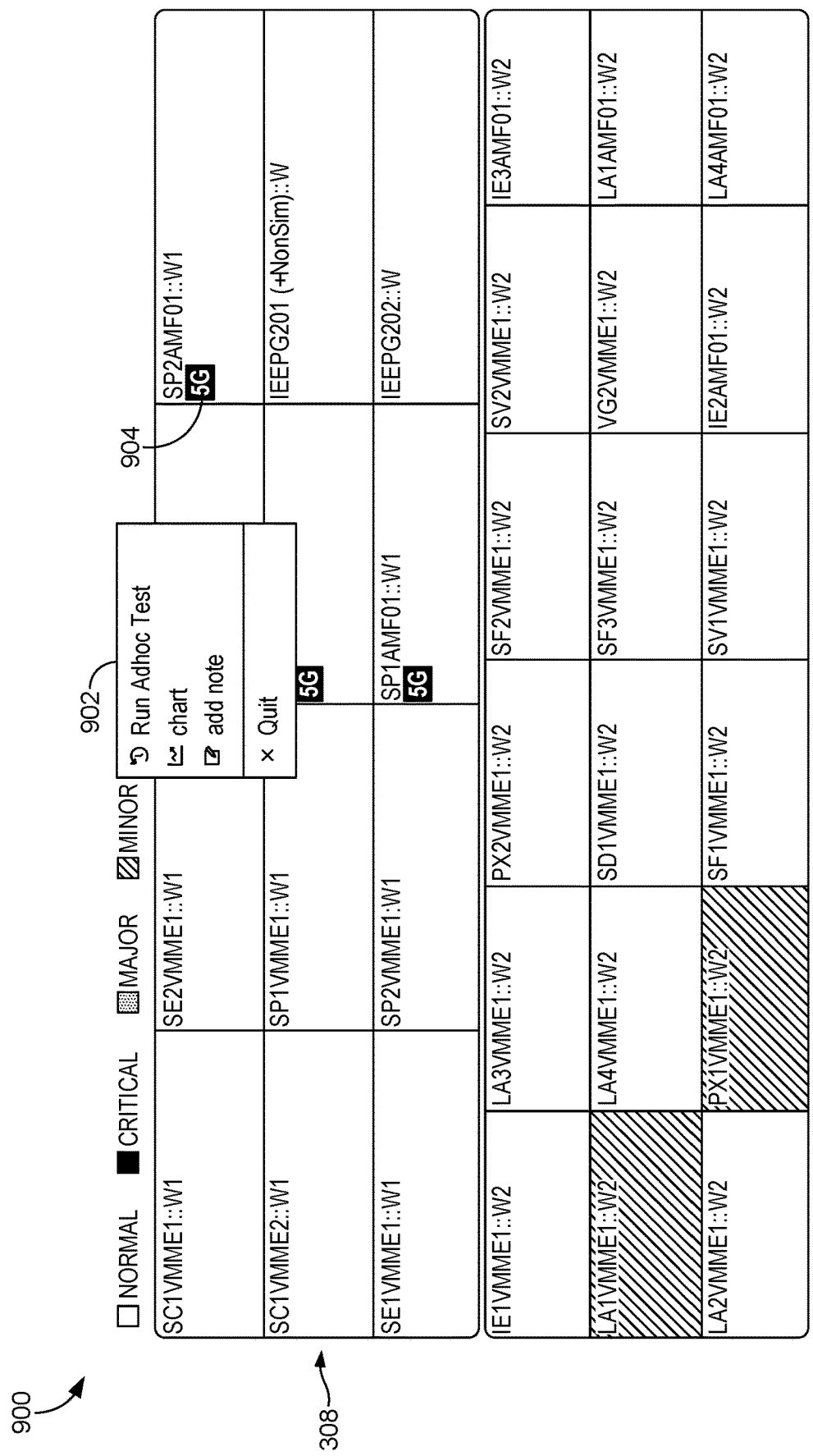
FIG. 9 illustrates a network region grid with 5G test probes, in accordance with aspects herein.

FIG. 9 depicts a network region grid with 5G test probes, in accordance with aspects of the disclosure. The network region grid screen with 5G test probes 900 includes a 5G test node drop down menu 902. The 5G test node drop down menu 902 includes options such as running an ad hoc test, preparing a chart, adding a note, and quitting the menu. Network nodes with 5G test probes 904 as indicated by the 5G indication in a contrasting color against the node background color in the network regions 308 display.

FIG. 10 illustrates a 5G test parameters screen 1000. The 5G test parameters screen 1000 includes test parameters, including radio buttons for selecting tests, a submit button to input the selected radio button to the test software and initiate the probe testing. The result is presented below, as passed or failed. The 5G test parameters screen 1000 illustrated shows the test as successfully passed.

FIG. 11 shows a drop down menu for selecting cities to test using 5G test probes. The 5G test parameters screen 1100 includes a drop down city selection menu 1102 that allows selection of various cities across a network. The network may be nationwide, as shown in FIG. 11, or may cover a smaller area, such as a state or region.

Figure 12:
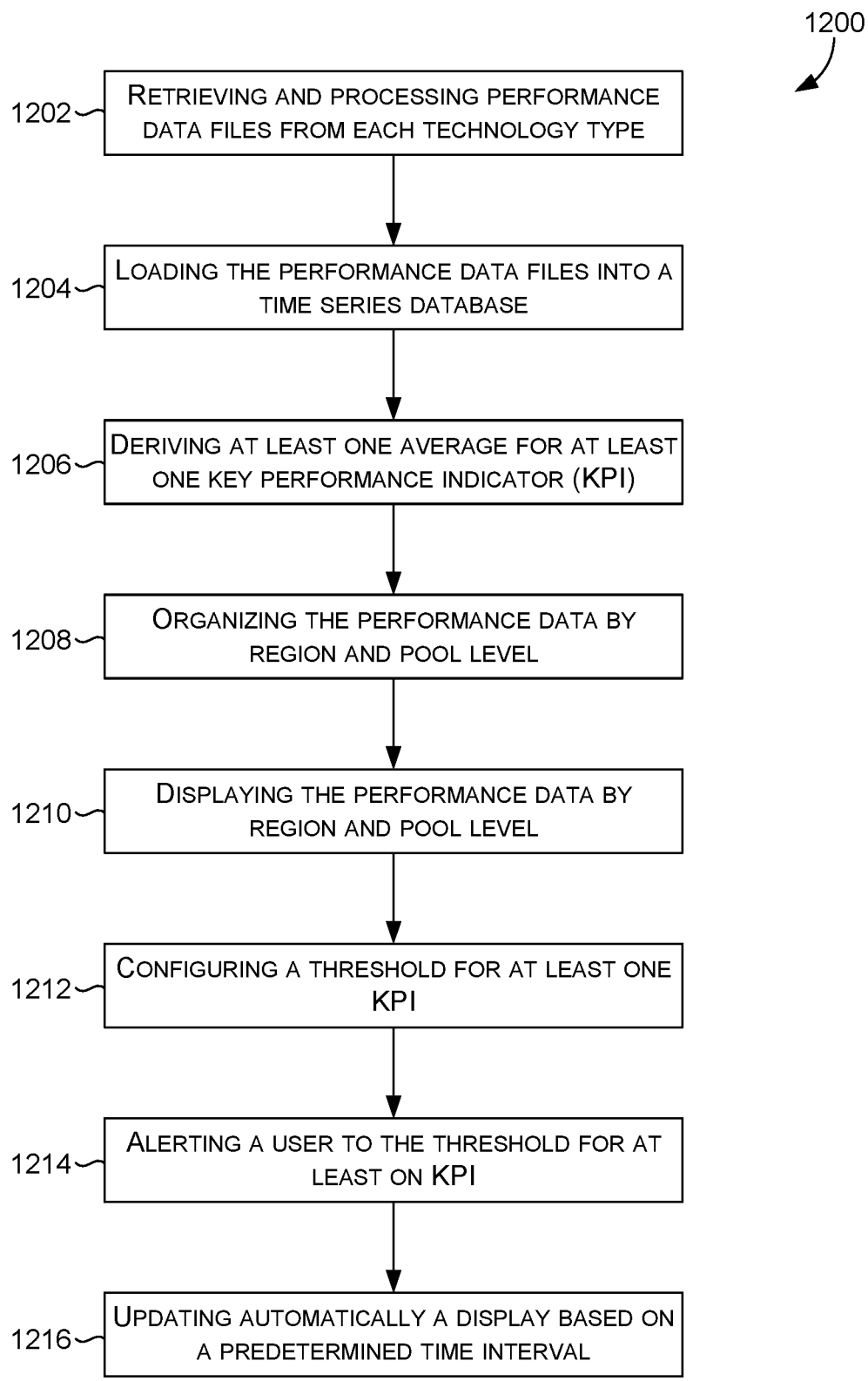
FIG. 12 is a flow diagram of a method for network monitoring in according with aspects herein.

FIG. 12 is a flow diagram of a method for network monitoring in accordance with aspects herein. The method 1200 begins with fetching and processing performance data files from each technology type in step 1202. The method continues in step 1204 with loading the performance data into a time series database. Then, in step 1206, deriving at least one average for at least one key performance indicator (KPI) occurs. The method continues in step 1208 with organizing the performance data by region and pool level. Then, in step 1210 displaying the performance data by region and pool level occurs. In step 1212 the method continues with configuring a threshold for at least one KPI. The at least one KPI may be selected from: key error indicator (KEI), key capacity indicator (KCI), and key quality indicator (KQI). The threshold may provide alerts and may also modify aspects of the display, such as turning a background color from green to red. The method continues with step 1214 with alerting users to the threshold for at least one KPI. The alert may be displayed on the screen by a message. The method concludes with step 1216, updating automatically a display based on a predetermined time interval.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method of network monitoring, the method comprising:
   retrieving and processing performance data files from each technology type;
   loading the performance data files into a time series database;
   deriving at least one average for at least one key performance indicator (KPI);
   organizing performance data of the performance data files by region and pool level;
   displaying the performance data by region and pool level;
   configuring a threshold for the at least one KPI;
   alerting a user to the threshold for the at least on KPI; and
   updating automatically a display based on a predetermined time interval.

2. The network monitoring method of claim 1, further comprising selecting a test probe from the display to perform a test.

3. The network monitoring method of claim 2, wherein selecting the test probe from the display selects a node within a geographic region to perform the test.

4. The network monitoring method of claim 1, wherein updating automatically the display changes a background color on at least one node of the network.

5. The network monitoring method of claim 4, wherein the change in background color indicates a change in node performance.

6. The network monitoring method of claim 5, wherein the color green indicates normal operation, red indicates critical performance faults, orange indicates major performance faults, blue indicates out of rotation, and gray indicates no data available.

7. The network monitoring method of claim 1, wherein the display indicates 5G nodes.

8. The network monitoring method of claim 1, wherein retrieving performance data files retrieves the performance data files from each node.

9. The network monitoring method of claim 8, wherein the retrieved performance data files are organized by region and pool level.

10. The network monitoring method of claim 2, wherein the test probe performs a virtualized test within a predetermined time period.

11. The network monitoring method of claim 2, wherein the test probe performs an ad hoc test.

12. A device for network monitoring, comprising:
   a display;
   a processor; and
   a memory that stores executable instructions that, when executed by the processor, perform operations comprising:
   retrieving and processing performance data files from each technology type, wherein the performance data files comprise performance data;
   loading the performance data files into a time series database;
   deriving at least one average for at least one key performance indicator (KPI);
   organizing the performance data from the performance data files by region and pool level;
   displaying the performance data by region and pool level;
   configuring a threshold for the at least one KPI;
   alerting a user to the threshold for the at least on KPI; and
   updating automatically a display based on a predetermined time interval.

13. The device of claim 12, further comprising selecting a test probe from the display to perform a test.

14. The device of claim 12, further comprising selecting a technology type to test.

15. The device of claim 14, wherein the technology type to test is selected from a drop-down menu on the display.

16. The device of claim 12, further comprising selecting a time interval for updates via a button on the display.

17. The device of claim 12 wherein the at least one KPI is one of: key error indicator (KEI), key capacity indicator (KCI), and key quality indicator (KQI).

18. A system comprising:
   a memory storing computer-executable instructions; and
   a processor configured to access the memory and to execute the computer-executable instructions to:
   retrieve and process performance data files from each technology type, wherein the performance data files comprise performance data;
   load the performance data files into a time series database;
   derive at least one average for at least one key performance indicator (KPI);
   organize the performance data from the performance data files by region and pool level;
   display the performance data by region and pool level;
   configure a threshold for the at least one KPI;
   alert a user to the threshold for the at least on KPI; and
   update automatically a display based on a predetermined time interval.

19. The system of claim 18, further comprising selecting a test probe from the display to perform a test.

20. The system of claim 19, wherein selecting the test probe from the display selects a node within a geographic region to perform the test.

\* \* \* \* \*